Oct. 25, 1927.
G. BAYER
1,646,520
ABSORPTION REFRIGERATING APPARATUS
Filed Nov. 3, 1925
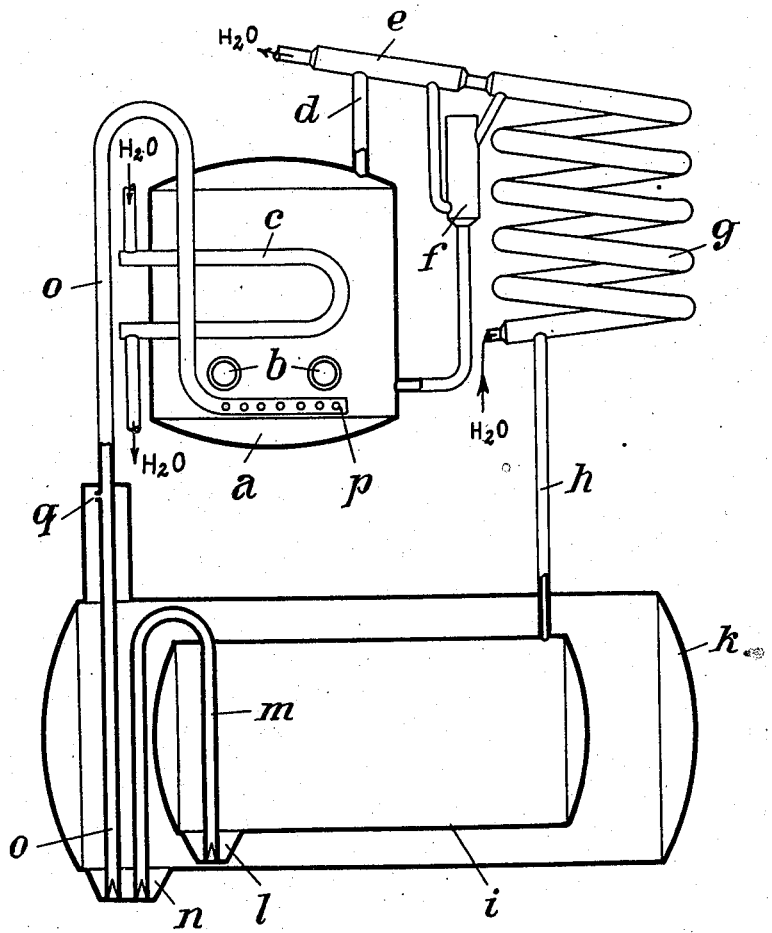

Patented Oct. 25, 1927.

1,646,520

UNITED STATES PATENT OFFICE.

GAUDENZ BÄYER, OF AUGSBURG, GERMANY.

ABSORPTION REFRIGERATING APPARATUS.

Application filed November 3, 1925, Serial No. 66,436, and in Germany August 1, 1925.

This invention refers broadly to refrigerating machines of the absorption type, and in particular to machines of the kind referred to adapted for intermittent operation and comprising a boiler and an absorber which may be combined into a unit, and which further comprises a condenser and a vaporizer, and the invention is intended to generally improve the operation and efficiency of machines of this kind, to provide a more compact and reliable construction than heretofore, and to make provision for overcoming various difficulties and drawbacks of operation. In the machines of the general character referred to there was the difficulty that the refrigerating agent, such as ammonia for instance, which was liquefied in the condenser was transferred into the vaporizer at the temperature of the cooling water, so that the refrigerating agent produced a substantial rise of the temperature of the cooling chamber surrounding the vaporizer during the entire boiling period. Now, in view thereof, it is one of the important objects of my invention to prevent the transfer of the heat of the condensed refrigerating agent to the cooling chamber. For this purpose a separate collecting chamber for the warm condensate is provided which is disposed within the vaporizing chamber proper, and which by this means is heat-insulated with relation to the cooling chamber, so that no appreciable heat is communicated to the cooling chamber from the collecting vessel in which the warm condensate accumulates during the boiling period.

It is a further object of my invention to provide means of automatically transferring the contents of the storage vessel into the vaporizer vessel or tank at the beginning of the absorption and vaporizing period. These and other objects and advantages of the invention will appear, as the specification proceeds.

The invention will be further described in connection with the accompanying drawing showing by way of example and in a somewhat diagrammatic manner an elevational view of an absorption refrigerating machine embodying the principles of my invention.

In the drawing:—The boiler which at the same time serves as the absorber is indicated at $a$, and $b$ are the electric heating means for the heating of the boiler, and which, of course, may be replaced by any other suitable heating means. $c$ indicates the cooling means for the combined boiler and absorber, which in the exemplification shown comprises a circulating pipe through which water is caused to flow. From the top of the boiler a pipe $d$ is branched off for the discharge of the vapors of refrigerating fluid (ammonia) evolved by the boiling of the refrigerant, the said pipe $d$ being connected to a preliminary condenser $e$ which opens up into a water separator $f$. To the water separator $f$ the main condenser $g$ is connected which may be cooled by water, the same as the preliminary condenser. This condenser $g$ is also connected by a comparatively very narrow tube $h$ to a collecting vessel or tank $i$ which is disposed within and spaced from the walls of the vaporizing vessel $k$. The collecting tank or vessel $i$ is provided with a depression or sump $l$ for the reception of a pool of liquid in which a siphon pipe is immersed at $m$. This siphon passes through the walls of the collector $i$ and the other end is immersed in liquid in a sump $n$ in the vaporizer vessel $k$. Into the same sump $n$ of the vaporizer $k$ another pipe $o$ is immersed. This is of a comparatively large diameter, in respect to the pipe $h$. The said larger pipe $o$ emerging through the walls of the vaporizer $k$ and terminating below the level of the liquid in the combined boiler and absorber $a$. It is provided at its extremity with a distributor $p$. In the interior of the steam space of the vaporizer $k$ the pipe $o$ is provided with a small aperture $q$.

The machine substantially operates in the following manner. During the heating of the boiler-absorber by means of the heating appliance $b$ the vapors of ammonia which have become condensed in the condenser $g$ will collect in the collecting or storage vessel $i$ without any opportunity of escaping into the vaporizing vessel $k$. In view of the fact that the storage vessel $i$ is surrounded on all sides by the vaporizing tank $k$ no appreciable amount of heat can be conveyed from this collecting vessel $i$ into the cooling chamber surrounding the vaporizing tank $k$. Upon the termination of the boiling period the combined boiler and absorber $a$ is cooled by means of the cooling conduit $c$, and in consequence thereof a comparatively high suction pressure is created in the boiler-absorber $a$. This suction pressure will be conveyed along the line of least resistance, that is to say, through the larger pipe $o$ into the vaporizing vessel $k$, so that a low pressure will prevail in the vaporizing tank $k$ with relation to the collecting vessel $i$. This low pressure causes liquid to be aspirated through the siphon pipe $m$ from the storage or collecting vessel $i$ until the entire contents of said vessel $i$ are transferred by siphoning into the vaporizing vessel $k$. Now evaporation takes place in the vaporizing vessel $k$ which is exposed to the action of the external heat, that is to say the temperature of the cooling room. The vapors produced are aspirated into the larger pipe $o$ through its aperture $q$, and the vapors then flow through the distributor $p$ into the absorbent contained in the combined boiler and absorber $a$.

While I have shown and described in the present instance a preferred embodiment of my invention which I have found to produce reliable results, it should be understood that the invention is susceptible of modifications in various particulars without thereby sacrificing any of its advantages and without deviating from the scope and spirit of the invention, as particularly set forth in the appended claims.

I claim:

1. In an absorption refrigerating machine the combination with a boiler-absorber for the refrigerant, of a collecting and storage vessel, heating means for the boiler-absorber, and vapor-condensing means intermediate the boiler-absorber and the collecting vessel and connecting the same, a vaporizing vessel surrounding the collecting vessel, intermittently operating fluid-transferring means connecting the collecting vessel to the vaporizing vessel, and communicating means between the vaporizing vessel and the boiler-absorber.

2. In an absorption refrigerating machine the combination with a boiler absorber, of cooling and heating means in said boiler-absorber, a collecting and storage vessel, vapor-condensing means intermediate the boiler-absorber and the storage vessel and communicating therewith, communicating means between the boiler-absorber and the vapor-condensing means, a vaporizing vessel, surrounding the storage and collecting vessel, intermittently operating fluid-transferring means connecting the storage and collecting vessel to the vaporizing vessel, and communicating means between the vaporizing vessel and the combined boiler-absorber.

3. In an absorption refrigerating machine the combination with a combined boiler-absorber, of cooling and heating means for said absorber, vapor-condensing means connected to the boiler-absorber, a collecting vessel and a relatively narrow communicating pipe between the condensing means and the collecting vessel, a vaporizing vessel, surrounding the collecting vessel, a relatively large communicating pipe between the vaporizing vessel and the boiler-absorber, and intermittently operating delivering means connecting the collecting vessel to the vaporizing vessel.

4. In an absorption refrigerating machine the combination with an absorber, of cooling and heating means for said boiler-absorber, vapor-condensing means connected to the boiler-absorber, a collecting vessel and a relatively narrow communicating pipe between the condensing means and the collecting vessel, a vaporizing vessel, surrounding the collecting vessel, siphoning means between the bottom portions of the collecting and vaporizing vessels, a relatively large communicating pipe between the bottom portion of the vaporizing vessel and the boiler-absorber, and an apertured part in said large pipe and located in the upper portion of the vaporizing vessel.

5. In an absorption refrigerating machine in combination, a collecting vessel, a vaporizing vessel, spacedly surrounding the same, siphoning means connecting the bottom portions of the collecting vessel and vaporizing vessel, a boiler-absorber, adapted for the reception of a supply of refrigerant, heating and cooling means for said boiler-absorber, vapor condensing means communicating with the boiler-absorber and the collecting vessel, communicating means connecting the boiler-absorber to the vaporizing vessel, and a liquid seal for the last-mentioned communicating means.

6. An evaporator for refrigerating apparatus of the intermittently operating absorption type, including a vaporizing vessel and a refrigerant receiving vessel within and spaced from said vaporizing vessel, a conduit for delivering liquefied refrigerant to the receiving vessel, and means connecting the lower portion of the collecting vessel to the vaporizing vessel.

7. An evaporator for refrigerating apparatus of the intermittently operating absorption type, including a vaporizing vessel and a refrigerant receiving vessel within and spaced from said vaporizing vessel, a conduit for delivering liquefied refrigerant to the receiving vessel, and a siphon connecting the lower portion of said collecting vessel with the lower portion of said receiving vessel.

8. An evaporator for refrigerating apparatus of the intermittently operating absorption type, including a vaporizing vessel, a collecting and storing vessel disposed therein and enclosed thereby, each of said vessels having a depressed portion at the bottom thereof, a siphon connecting said depressed portions, a conduit for delivering liquefied refrigerant to the collecting and storing vessel, and a conduit for the escape of vaporized refrigerant from the vaporizing vessel.

In testimony whereof I affix my signature.

GAUDENZ BAYER.